United States Patent
Taylor

(10) Patent No.: US 7,054,739 B2
(45) Date of Patent: May 30, 2006

(54) RADIO NAVIGATION SYSTEM

(75) Inventor: Lucius O. Taylor, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/427,214

(22) Filed: May 1, 2003

(65) Prior Publication Data

US 2004/0220722 A1 Nov. 4, 2004

(51) Int. Cl.
G01C 21/26 (2006.01)
(52) U.S. Cl. .............. 701/200; 701/213; 342/359; 342/386; 342/442; 342/463; 343/815
(58) Field of Classification Search ............... 701/213, 701/225, 200, 207–208, 214–217, 224; 342/422, 342/464, 350, 352, 463, 465, 367, 147, 428, 342/394, 46, 49, 82, 359, 386, 417, 423, 342/442–445; 455/456.1, 82, 101, 562.1, 455/11.1, 12.1, 13.1, 13.3, 25, 296, 303, 63.1; 343/702, 861, 814–815, 810, 893
See application file for complete search history.

(56) References Cited

U.S. PATENT DOCUMENTS

| 3,766,560 | A | * | 10/1973 | Bornhorst et al. | 342/428 |
| 3,781,890 | A | * | 12/1973 | Boyer | 342/367 |
| 3,889,264 | A |   | 6/1975  | Fletcher | 342/394 |
| 4,054,880 | A |   | 10/1977 | Dalabakis et al. | 342/464 |
| 4,148,034 | A | * | 4/1979  | Cooney | 342/402 |
| 4,454,583 | A |   | 6/1984  | Schneiderhan et al. | 701/213 |
| 4,876,550 | A |   | 10/1989 | Kelly | 342/451 |
| 5,499,032 | A |   | 3/1996  | Kelley et al. | 342/463 |
| 5,564,086 | A | * | 10/1996 | Cygan et al. | 455/126 |
| 5,689,270 | A |   | 11/1997 | Kelley et al. | 342/357.03 |
| 5,722,064 | A | * | 2/1998  | Campana, Jr. | 455/351 |
| 5,936,572 | A | * | 8/1999  | Loomis et al. | 342/457 |
| 5,957,995 | A |   | 9/1999  | Beckmann et al. | 701/213 |
| 6,049,310 | A | * | 4/2000  | Sadahiro | 343/702 |
| 6,127,975 | A | * | 10/2000 | Maloney | 342/457 |
| 6,163,753 | A |   | 12/2000 | Beckmann et al. | 701/213 |

(Continued)

FOREIGN PATENT DOCUMENTS

EP 0 502 312 1/1992

(Continued)

OTHER PUBLICATIONS

English translation of abstract of EP 0 502 312.

(Continued)

*Primary Examiner*—Jacques H. Louis-Jacques
(74) *Attorney, Agent, or Firm*—McDonnell Boehnen Hulbert & Berghoff LLP

(57) ABSTRACT

Navigation apparatus that may include a radio receiver, at least one directional antenna communicatively coupled to the radio receiver, and a navigation computer including a memory and a processor. The navigation computer may be communicatively coupled to the radio receiver to receive relative bearing information from the directional antenna to a set of known radio transmitters, such as (but not limited to) commercial broadcast radio or television stations. Using a database stored in the memory that includes a record of position information and a record of radio frequency information for the set of known radio transmitters, the apparatus allows for the calculation of one or more reference positions using relative bearing information to the set of known radio transmitters and the stored, known positions of the set of known radio transmitters.

16 Claims, 5 Drawing Sheets

U.S. PATENT DOCUMENTS

| | | |
|---|---|---|
| 6,205,400 B1 | 3/2001 | Lin .......................... 701/214 |
| 6,300,903 B1 * | 10/2001 | Richards et al. ............ 342/450 |
| 6,492,945 B1 * | 12/2002 | Counselman et al. ....... 342/464 |
| 6,553,210 B1 * | 4/2003 | Lindemann et al. .......... 455/82 |
| 6,577,273 B1 * | 6/2003 | Hamada et al. ............. 342/442 |

FOREIGN PATENT DOCUMENTS

| | | |
|---|---|---|
| GB | 2 047 039 | 3/1980 |
| GB | 2246041 A * | 1/1992 |

OTHER PUBLICATIONS

C. Plath GmbH Hamburg—Coastal monitoring with the support of radio direction finding in the EEZ (Enhanced Economic Zone), http://www.plath.de/eng/news_article02.htm, printed from the World Wide Web on Oct. 26, 2001.

* cited by examiner

RADIO NAVIGATION SYSTEM

BACKGROUND

1. Field of the Invention

The present invention relates to the field of radio navigation and, more particularly, to radio navigation using radio transmitters.

2. General Background

Global positioning systems (GPS) have become nearly ubiquitous as navigational aids, for individual users as well as, more importantly, aviation users. GPS receivers are accurate and relatively inexpensive, and they are also easy to use, because they are area navigation (RNAV) systems. RNAV systems allow navigation on any desired course within the system's area of coverage. In other words, an RNAV user is not limited to following a specific track to or from a radio navigation aid (as a user must with some navigational aids), but can simply plot and follow waypoints that make up an RNAV route.

For aircraft navigation, GPS is currently used mainly as a supplemental RNAV system, although there are plans in the United States to make GPS the primary basis for radionavigation by the year 2010. There is a strong economic motivation to use GPS as a primary basis of navigation due to the expense of maintaining land-based navigational aids (navaids) currently in place, such as LORAN, VOR, DME, etc. For critical uses such as aircraft navigation, however, the very low power signals employed by GPS satellites can be a cause for concern, especially if GPS is used as a primary basis of navigation, rather than as a backup system for other established navigation systems. Specifically, the extremely low-power GPS signals may be susceptible to jamming or interference due to weather conditions, radio noise, or other sources. This is true even though GPS augmentations such as the Local Area Augmentation System, Wide Area Augmentation System, and other augmentations can improve the accuracy, integrity, and availability of the basic GPS.

Some navaids, such as automatic direction finding (ADF) and very-high frequency omni-directional range (VOR) are not automatic, provide only limited information, such as deviation from a given ground track, and can increase pilot workload because their use is non-intuitive. RNAV systems other than GPS require highly specialized airborne equipment and ground-based transmitters, and provide limited coverage of available airspace. Thus, an accurate, high-availability RNAV system whose infrastructure costs little or nothing to build and maintain, that is completely independent of GPS and traditional ground-based navaids, and that is automatic and intuitive to use would be desirable, and could greatly increase the safety and reliability of commercial and general aviation. In addition, having an RNAV system as a primary or backup navigation system (rather than ADF or VOR, for example) allows lateral freedom and thus a more complete and efficient use of airspace.

Furthermore, while GPS can provide a highly accurate positional fix for an aircraft (or other vehicle), it does not provide a true heading. This can create inconsistency in an aircraft heads-up display that relies on a GPS receiver as a primary basis of navigation. Specifically, as an airport, for example, becomes visible when an aircraft approaches it during a low-visibility condition, the heads-up display will not be aligned with the visible scene if the aircraft's true heading differs from its true bearing (for example, when strong crosswinds are present). Thus, an apparatus that provides a true heading could improve the functionality of an aircraft navigation system.

SUMMARY

An exemplary embodiment of a navigation apparatus that includes a radio receiver, at least one directional antenna communicatively coupled to the radio receiver, and a navigation computer communicatively coupled to the radio receiver, is disclosed. Although the apparatus may be used, for example, on a moving platform such as an aircraft, a boat, or other vehicle, or even to determine the position of a fixed object, the apparatus will be described in reference to an aircraft for purposes of illustration. The navigation computer may include a memory and a processor; the memory may include, among other data, a database comprising a record of position information and a record of radio frequency information for a plurality of known radio transmitters.

The navigation computer can command the radio receiver to tune to a number of the known radio transmitters, either simultaneously or in rapid succession, depending on the receiver. The receiver can receive relative bearing information from the directional antenna to each of the tuned radio transmitters, and the relative bearing information can be communicated to the navigation computer. Because the position of the tuned radio transmitters is known and stored in the memory, the navigation computer can then calculate the position of the directional antenna (and thus the aircraft) over a point on the earth's surface whenever three or more transmitters are tuned. Alternatively, the navigation computer can calculate the position at a point on the earth's surface if the apparatus is used in a boat or other surface vehicle.

The calculation can be made using the known positions of the tuned transmitters and the relative bearings to each of the tuned transmitters. Alternatively, the apparatus could calculate the position of the aircraft using fewer than three known transmitters combined with other position information, such as GPS satellite range data and/or position information from another navaid such as a compass or a radio navigation system such as VOR/DME, LORAN C, etc.

Once the position of the aircraft (i.e., the reference position) is known, a true bearing from the reference position to some or all of the tuned radio transmitters can be calculated in the navigation computer using the reference position and the known position of the tuned transmitters. The true bearing from the reference position to any known point is the angle between a line extending north of the reference position and a line extending from the reference position to the known point. If the true bearing of the reference position to one or more tuned transmitters is known, the true heading of the aircraft can be calculated by the navigation computer using the relative bearing to one or more of the tuned transmitters and the true bearing information.

In addition to determining one reference position, the apparatus may be used to determine multiple reference positions at known time intervals. Using these multiple positional reference points, the navigation computer can calculate ground speed and track, and it can further use the ground speed and track to correct for timing differences (if any) when relative bearings to multiple known transmitters are first received. Specifically, once a reference position is calculated, even approximately, the relative bearings to known positions taken at a later time can be retarded to coincide with a prior reading or readings, and the navigation computer can calculate (or recalculate) the reference position as though all relative bearings were measured at the same time. This technique can improve the accuracy of the navigation apparatus even if radio stations are tuned and relative bearings to them are determined very quickly; due to the high speed of modern aircraft, the aircraft could travel several feet or more even using a high-speed, solid-state directional antenna and receiver system.

A navigation system that uses very high-powered commercial broadcast stations as disclosed here may provide navigation information over a much larger area than conventional navaids such as ADF and VOR, which are relatively low-powered. Furthermore, the exemplary embodiment is an RNAV system that can provide simple point-to-point navigation to a user with a minimum of operator involvement due to a high degree of automation.

BRIEF DESCRIPTION OF THE DRAWINGS

An exemplary embodiment is described herein with reference to the drawings, in which.

DETAILED DESCRIPTION

Figure 1:
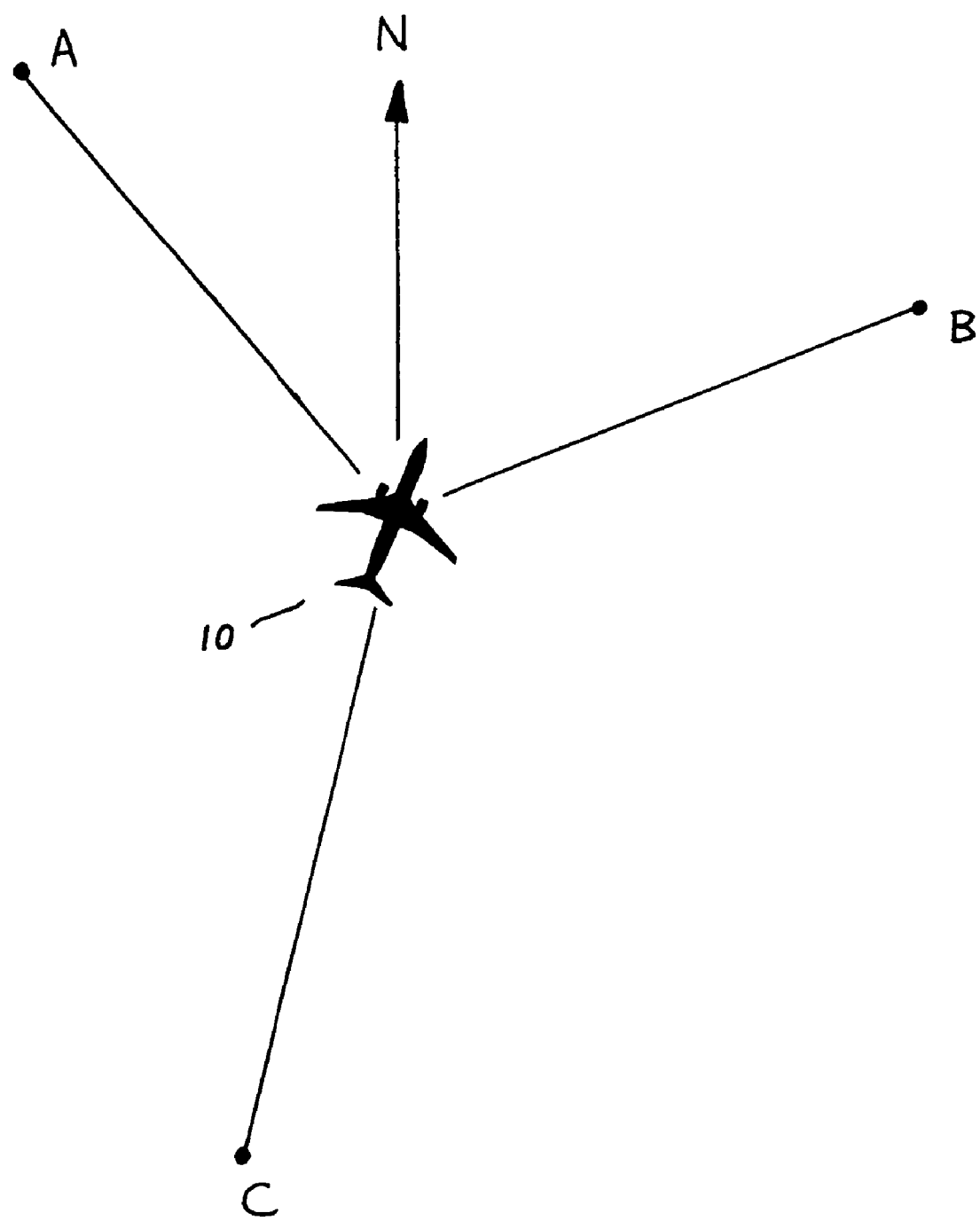
FIG. 1 is a simplified diagram of an aircraft within range of a set of radio transmitters such that the position of the aircraft may be determined in accordance with the exemplary embodiment.

FIG. 1 is a simplified diagram illustrating an aircraft flying within a fixed coordinate reference system according to an exemplary embodiment of the present invention. Although illustrated in the context of an aircraft, various embodiments may be applied to other fixed or moving platforms, such as cars, trucks, boats, etc. Accordingly, the present application is intended to encompass these additional embodiments and others.

Figure 2:
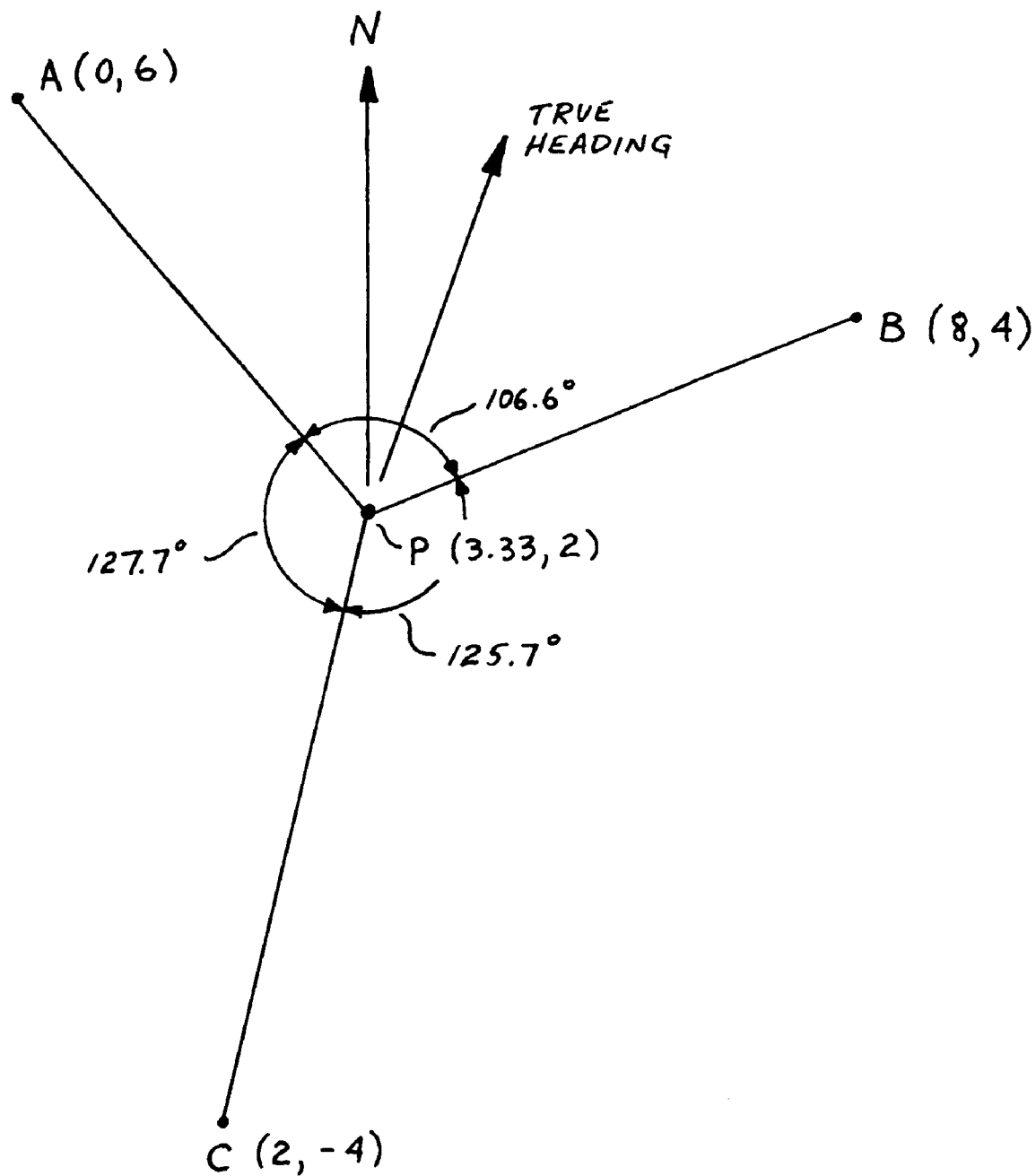
FIG. 2 is a simplified conceptual diagram of coordinates for the aircraft and transmitters of FIG. 1 that illustrates the exemplary embodiment.

Consider that aircraft 10 is at a point P (as shown in FIG. 2) at a given instant in time. Aircraft 10 may include a radio receiver coupled to a directional antenna, and the antenna may be within range of several radio transmitters, such as transmitters A, B, and C. Transmitters A, B, and C could be any radio transmitters, such as (without limitation) commercial radio or television broadcast transmitters, or radio navigation transmitters. If the positions of transmitters A, B, and C are known, and if aircraft 10 is capable of tuning to the transmissions from the stations and determining relative bearings to each of them is using radio direction finding, a system onboard aircraft 10 can calculate the relative bearings to each station. After determining relative bearings to each of the stations (that is, horizontal angles between the longitudinal axis of the aircraft and each station), the reference position P of aircraft 10 can be calculated using the known positions of the transmitters.

Once reference position P is determined, a true bearing can be calculated from P to any of the transmitters (once again using the known positions of the transmitters, combined with the calculated position P). Knowing position P, at least one true bearing to a transmitter, and the relative bearing to that transmitter, aircraft 10's true heading (that is, the horizontal angle formed by its longitudinal axis and true north) can be determined. When no other navigational information is available to aircraft 10, at least three transmitters must be "available", that is, within range of aircraft 10's receiver, in order to enable aircraft 10 to calculate its position. This is because the lines from reference position P to any three transmitters will intersect at a single point defined by the angle between the transmitters to the single point and the known positions of each transmitter. Although three transmitters may be sufficient to calculate position, when more than three transmitters are used, and when the position of the aircraft relative to the available transmitters is favorable, the accuracy of a position fix can be improved over the accuracy of a three-transmitter fix.

FIG. 2 is a simplified graphical representation of measurements that may be determined using the exemplary embodiment. For purposes of illustration, only three transmitters, A, B, and C, are shown in FIG. 2, although as noted above more could be used. Assume, for reference, that transmitters A, B, and C are at points (0, 6), (8, 4), and (2, −4), respectively; for purposes of illustration, a simple Cartesian coordinate system is shown, although the positions of transmitters A, B, and C would normally be in the form of latitude/longitude. Moreover, while a flat surface is assumed for the reference system, the exemplary embodiment could be implemented using a great circle navigation algorithm to take into account the earth's curvature. Over the relatively short distances where radio transmissions can be reliably received, a flat surface is a reasonable approximation of the earth's surface.

Let reference position P represent the (initially unknown) position of aircraft 10.

Assume aircraft 10 has a true heading of 20°, which is also initially unknown. If a radio navigation system on aircraft 10 measures a relative bearing of 172.5° from P to transmitter C, and a relative bearing of 46.8° to transmitter B, the angle with respect to P of transmitters C and B must be 172.5°−46.8°, or about 125.7°. Similarly, if a relative bearing of 300.2° is measured from P to transmitter A, the angle with respect to P of transmitters A and B must be (360°−300.2°)+46.8°, or about 106.6°. The remaining angle from transmitter A to C can similarly be calculated as approximately 127.7°. Using a navigational algorithm that solves for possible positions P either iteratively or through direct calculation, a navigation computer can determine that if and only if P has coordinates of about (3.33, 2) will the angles to stations A, B, and C be as stated above. In this example, then, aircraft 10 would be somewhere above reference point P (3.33, 2), since point P is a ground position.

Now, using the calculated position (3.33, 2) for P and the known position of, for example, transmitter B, the true bearing (i.e., the bearing from P to transmitter B with respect to true north) from P to transmitter B would be 90° minus the inclination of line PB:

$$\text{True bearing} = 90° - \tan^{-1}\frac{4-2}{8-3.33} = 66.8°$$

Recall that the measured relative bearing to transmitter B was 46.8°; subtracting 46.8° from the true bearing yields a true heading of 20°. Although this example used a position P inside a triangle formed by transmitters A, B, and C, the system could work equally well if P were outside such a triangle, although a different algorithm may be required.

The accuracy of measurements made with the exemplary system could be affected not only by the geometry of the location of the transmitters, but also by such factors as: the number of stations available; the accuracy of the directional antenna and receiver system used; the accuracy of the positional data of the known transmitters; refraction or reflection of the radio signals; the navigation algorithm and any filtering algorithms used to calculate or refine a position fix; and the length of time between measurements, etc. If a number of transmitters are available and one or more of them produces an anomalous result (as might be the case when there is some kind of interference, such as refraction or reflection of the direct signal), or if using a signal from a particular transmitter would result in a geometric dilution of precision, the transmitter or transmitters that appear to be anomalous could simply be ignored. Further, the integrity of the exemplary system could be independently monitored by using any other available position information, such as GPS information. Similarly, the exemplary system could be used to independently verify the integrity of a GPS receiver.

Figure 3:
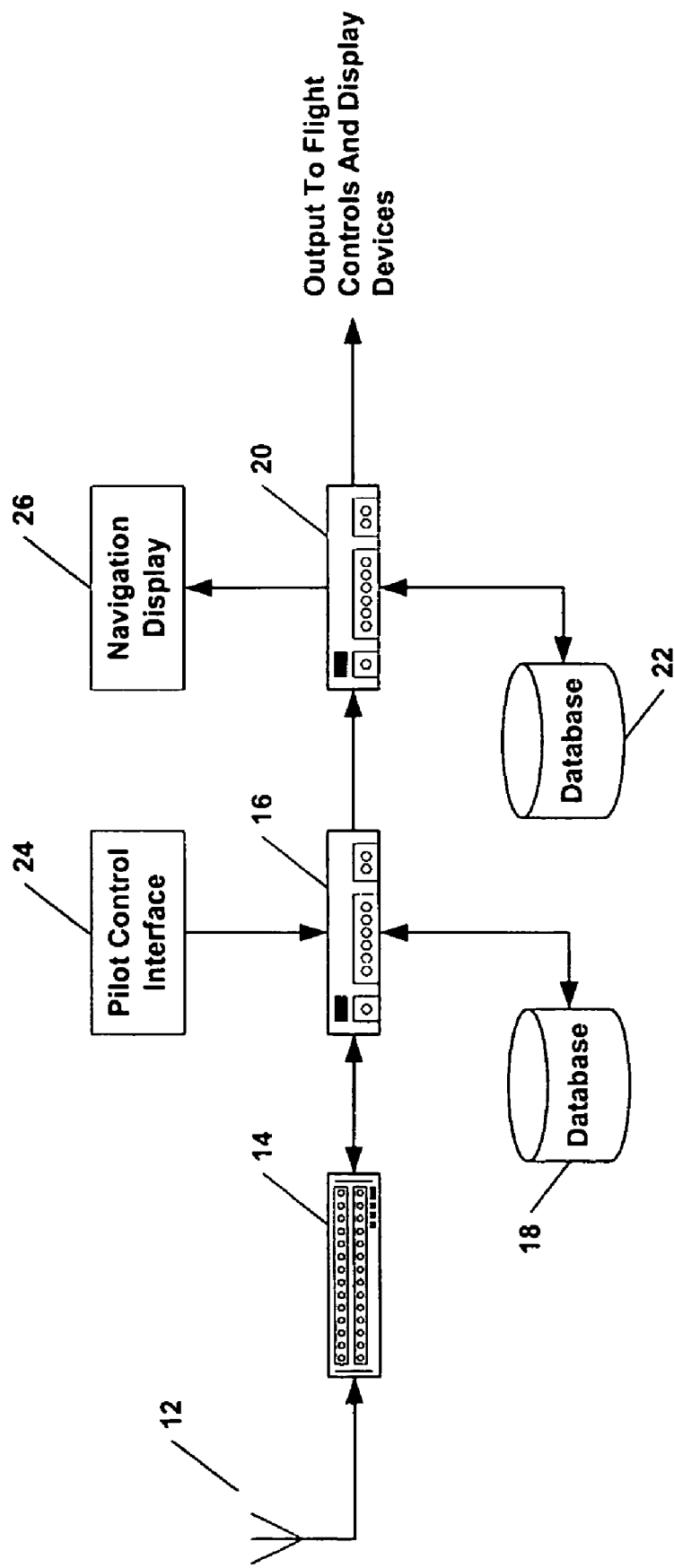
FIG. 3 is a simplified conceptual diagram illustrating several components that may provide functionality according to an exemplary embodiment.

FIG. 3 illustrates a simplified conceptual diagram of functional blocks that may be used to implement the exemplary embodiment. As shown, the embodiment may include: a directional antenna 12; a tuner/receiver 14; a receiver processor 16; a receiver database 18; a navigation processor 20; a navigation database 22; a pilot control interface 24; and a navigation display 26. It should be emphasized that the physical locations of the various functional elements shown are not necessarily critical to all embodiments of the present invention, especially in view of the interoperability of many systems onboard modern aircraft. As just one example, some or all of the functions of the control interface and display elements shown in FIG. 3 may be carried out by coupling a navigation processor and/or other system components with an existing control/display unit on an aircraft, such as a GPS receiver, a radio NAVCOM unit, a flight management system (FMS), an autopilot, etc. As another example, all processing and memory functions could be carried out in a single processor and memory, respectively, or even in one device that includes a processor and memory integrated together.

To begin using the system, a pilot could initialize (or simply verify) an aircraft's current position upon system power-up. This could be done, for example, prior to takeoff. If the aircraft's current position is unknown or incorrect, the pilot could use pilot control interface 24 to enter a standard airport identifier for the current location, such as KORD (O'Hare International Airport in Chicago). Next, the pilot could enter the identifier for a desired destination airport, such as KBOS (General Edward Lawrence Logan Int'l Airport, Boston, Mass.). The latitude and longitude of these airports (as well as any others) could be stored in navigation database 22. Navigation database 22 (and also receiver database 18) could be maintained in a solid-state, magnetic, optical, or other memory device.

Upon takeoff from a known initial position, receiver processor 16 can determine which known transmitters could be within range by referring to receiver database 18. Then receiver processor 16 can cause tuner/receiver 14 to tune to (or attempt to tune to) the stations that should be within range of the initial position. Using a frequency-agile tuner/receiver or a multi-channel tuner/receiver for tuner/receiver 14, multiple stations can be tuned in very rapid succession or even simultaneously. Once a known transmitter is tuned, directional antenna 12, in conjunction with tuner/receiver 14, can determine the relative bearing from the aircraft to the transmitter. Directional antenna 12 may be a multi-element interferometric antenna. Directional antenna 12 could also be a combined loop/sense antenna, or virtually any other suitable directional antenna. In addition to providing relative bearing information to receiver processor 16, tuner/receiver 14 may have an optional audio output to enable a pilot or passenger to listen to commercial radio broadcasts.

If the exact position of the aircraft is unknown, receiver processor 16 could cause tuner/receiver 14 to begin a systematic search for transmitters in receiver database 18 until one is successfully tuned. Once one transmitter is tuned, receiver processor 16 could proceed as described above when the initial position was known, using the location of the tuned transmitter. Alternatively, receiver processor 16 could calculate an initial estimation of position using position data from any other system onboard the aircraft, such as a GPS receiver or a pilot's estimate of position, thus speeding up the process of locating a set of possible stations to tune.

The process of initially determining location could be sped up through the use of a unique station identifier, such as the radio data system (RDS) available in the United States and some other countries. In the United States, for example, RDS comprises digital information on a 57 KHz subcarrier within a standard FM signal. This digital information, which is unique to each station, could be used to eliminate the need to use a systematic search to find an identifiable radio station.

Once multiple known transmitters are tuned, receiver processor 16 can determine the aircraft's relative bearing to the transmitters and communicate these relative bearings, together with the known transmitter positions, to navigation processor 20. Navigation processor 20 can calculate a reference position P as described with reference to FIG. 2 using the relative bearing information and the known positions of a set of transmitters. Also as described above, once reference position P is known, navigation processor 20 can calculate the true heading of the aircraft, and this information can be displayed on navigation display 26 and any auxiliary displays.

Using the relative bearing information and the known transmitter positions, navigation processor 20 calculate a reference position of the aircraft, and navigation processor 20 can also refer to navigation database 22 to determine aircraft position relative to other known points stored in navigation database 22, such as airports, VOR stations, commercial broadcast stations, geographic features, etc. The reference position and heading information calculated by navigation processor 20 can be in the form of latitude/longitude and true heading in degrees clockwise from north.

In addition to landmark information and geographic references, navigation database 22 may also include preprogrammed flight plans, previous flight information stored by a user, such as a direct point-to-point flight plan, and a digitized map of the world or of a smaller region. Using the calculated reference position and the other information in navigation database 22, navigation processor 20 can generate an output to navigation display 26, which may in turn display aircraft information such as position, heading, bearing, course, course deviation, etc. Navigation display 26 may include a map display as well as other elements such as latitude, longitude, airport designators, etc. The aircraft's position may be shown on navigation display 26's map display relative to known geographical points such as airports, cities, coastlines, bodies of water, conventional navaids, etc. Further, an icon representing the aircraft may indicate the aircraft's current heading on the map display.

Navigation display 26 may also indicate the aircraft's current latitude and longitude digitally, its current heading in degrees, and, by taking successive measurements, groundspeed may also be calculated in navigation processor 20 and displayed on navigation display 26. In addition, navigation display 26 could be communicatively coupled with other instruments and sensors on the aircraft (not shown) that measure other parameters such as altitude and glideslope, which could then be conveniently displayed along with the other navigation information.

Besides driving navigation display 26, navigation processor 20 could also drive other displays such as a radio magnetic indicator (RMI) or a horizontal situation indicator (HSI) via an optional auxiliary display output. Since many RMIs and HSIs are designed for use with remotely mounted avionics, it would be possible to drive them from more than one source, such as an ADF unit and navigation processor 20. This would allow pilots or navigators trained to use ADF and VOR navigation systems to use a familiar display even when an aircraft is beyond the range of an ADF or VOR transmitter.

Navigation processor 20's optional auxiliary display output could also drive a course deviation indicator (CDI) on an HSI. Using the CDI, a pilot could manually fly an aircraft according to a desired flight plan or heading by referring to the CDI and making corrections, as with conventional navaids. Moreover, because the exemplary system can be aware of position relative to, for example, a destination airport, navigation processor 20 can drive the CDI at different resolutions in response to current position. For example, while enroute, a full-scale deflection of the CDI might represent 5 nautical miles off course. Once the aircraft is within 30 nautical miles of the destination airport, the full-scale deflection could change to 1 nautical mile. Within 2 nautical miles, the CDI could be driven at 0.3 nautical miles full-scale deflection, thus enabling a more accurate approach and landing of the aircraft.

Navigation processor 20 could also provide an output to any aircraft flight controls, such as a flight management system (FMS) or an autopilot system. Using data thus provided by navigation processor 20, such a system could be used to enable an aircraft to automatically fly a programmed navigation flight path, such as direct point-to-point legs, turn anticipation, legs in a flight plan, etc. The system could also be used in conjunction with an autopilot in "heading" mode to enable the aircraft to maintain a given heading.

Figure 4:
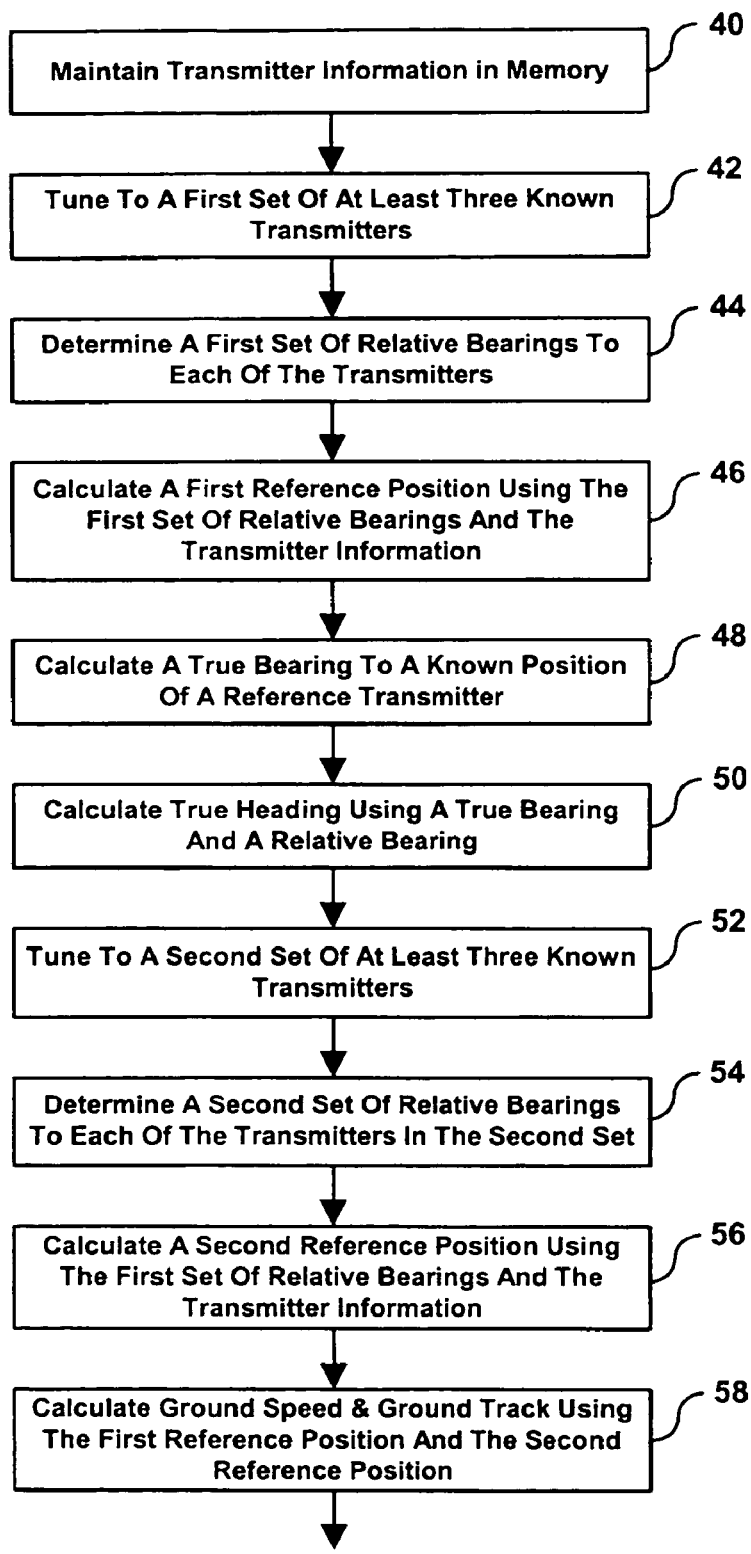
FIG. 4 is a flow chart depicting functions in accordance with the exemplary embodiment.
Figure 4A:
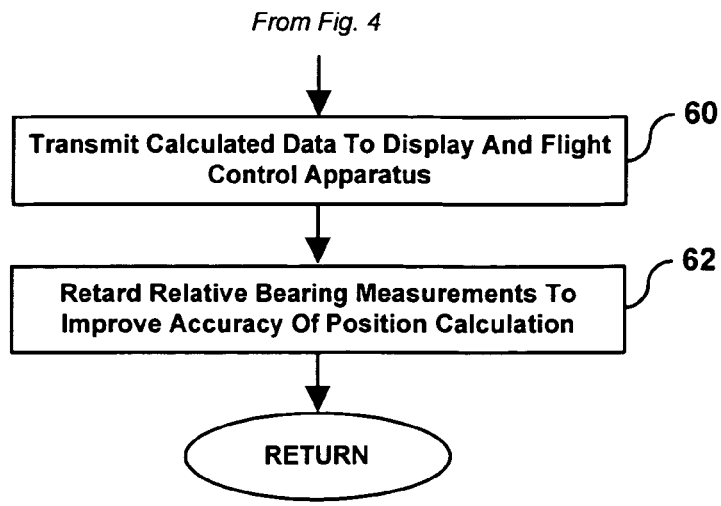
FIG. 4A is a continuation of the flow chart of FIG. 4 depicting functions in accordance with the exemplary embodiment.

FIG. 4 and FIG. 4A illustrate a set of functional blocks that may be used to carry out the exemplary embodiment. As shown at block 40, a database of transmitter information may be maintained in a memory. As shown at block 42, a processor may cause tuner/receiver 14 to tune to a first set of at least three known transmitters whose information is stored in the database. As the signal from each known transmitter is received, tuner/receiver 14 can, in conjunction with directional antenna 12, determine the relative bearing from the antenna to the first set of transmitters, per block 44. Using the stored position information of the transmitters and the relative bearings, the processor can calculate a first reference position of the directional antenna (and thus, to any vehicle on which it may be mounted), as shown at block 46.

Next, as shown at block 48, a processor can calculate a true bearing from directional antenna 12 to a known position of a reference transmitter selected from the first set of at least three known radio transmitters. Per block 50, the true heading of the directional antenna (or a vehicle on which it is mounted) can be calculated using the true bearing calculated at block 48 and the measured relative bearing to the reference transmitter. As illustrated by block 52, tuner/receiver 14 can tune to a second set of at least three known transmitters whose information is stored in the database. The second set of transmitters may be tuned subsequent to the first set, and the second set of transmitters may be the same transmitters as the first set, the second set may include some of the transmitters in the first set, or it may comprise a different set of transmitters altogether.

Tuner/receiver 14 can determine the relative bearings to the second set of at least three known transmitters as described above, as shown at block 54. Again, using the stored position information of the transmitters and the relative bearings from block 54, the processor can calculate a second reference position, as shown at block 56. Once the first and second reference positions are known, and because the time between measurements is also known, the processor can calculate other parameters such as ground speed and ground track, as shown at block 58. As illustrated by block 60, the processor can transmit this and any other information to a display or flight control apparatus for use in navigating the aircraft.

Once ground track and ground speed are calculated, the information can be used to retard relative bearing readings taken at different times so that the processor can calculate a reference position as if all readings were taken at the same instant, thus improving the accuracy of the reference position calculations, as shown at block 62. Using an estimated position, ground speed, and ground track, the processor can readily calculate the amount by which a relative bearing to a transmitter (call it transmitter D) would change in a given time. For example, suppose the relative bearing to a transmitter is 270°, the aircraft is traveling at 500 miles per hour, the transmitter is 200 miles away, and 5 seconds have elapsed since a relative bearing to a different transmitter E was measured. In 5 seconds, the aircraft will travel 0.694 miles, and the relative bearing to transmitter D would change by:

$$\sin^{-1}\frac{.694 \text{ miles}}{200 \text{ miles}} \cong .2°$$

so the relative bearing to transmitter D can be retarded by 0.2°; that is, a relative bearing of 270° minus 0.2°, or 269.8°, can be used in conjunction with the relative bearing to transmitter E (and any other transmitters) to refine the calculation of a reference position.

It is not necessary that the functions illustrated in FIG. 4 be carried out in any particular order for all embodiments of the invention. For example, any calculated data, such as the first reference position, may be transmitted to various display and navigation devices without first calculating a second reference position, ground speed, ground track, etc.

Exemplary embodiments of the present invention have been illustrated and described. It will be understood, however, that changes and modifications may be made to the invention without deviating from the spirit and scope of the invention, as defined by the following claims.

I claim:

1. A navigation apparatus comprising:
   a radio receiver;
   at least one directional antenna communicatively coupled to the radio receiver, the directional antenna providing relative bearing information to the radio receiver;

a navigation computer including a memory and a processor, the navigation computer being communicatively coupled to the radio receiver to receive relative bearing information;

a database stored in the memory, the database including a record of position information and a record of radio frequency information for a plurality of known radio transmitters;

a set of instructions stored in the memory and executable by the processor to cause the radio receiver to tune to at least three known radio transmitters selected from the plurality of known radio transmitters using the record of radio frequency information;

a set of instructions stored in the memory and executable by the processor to use relative bearing information from the at least one directional antenna to the at least three known radio transmitters and to use the record of position information to calculate a first reference position;

a set of instructions stored in the memory and executable by the processor to calculate a true bearing from the first reference position to a known position using the first reference position and a known position of at least one of the at least three known radio transmitters; and a set of instructions stored in the memory and executable by the processor to use relative bearing information from the at least one directional antenna to the at least three known radio transmitters and to use the true bearing to calculate a true heading.

2. The apparatus of claim 1, further comprising:
a display communicatively coupled to the navigation computer to display the first reference position.

3. The apparatus of claim 1, further comprising:
a display communicatively coupled to the navigation computer to display the true heading.

4. A navigation apparatus comprising:
a radio receiver;
at least one directional antenna communicatively coupled to the radio receiver, the directional antenna providing relative bearing information to the radio receiver;
a navigation computer including a memory and a processor, the navigation computer being communicatively coupled to the radio receiver to receive relative bearing information;
a database stored in the memory, the database including a record of position information and a record of radio frequency information for a plurality of known radio transmitters;
a set of instructions stored in the memory and executable by the processor to cause the radio receiver to tune to at least three known radio transmitters selected from the plurality of known radio transmitters using the record of radio frequency information;
a set of instructions stored in the memory and executable by the processor to use relative bearing information from the at least one directional antenna to the at least three known radio transmitters and to use the record of position information to calculate a first reference position;
a set of instructions stored in the memory and executable by the processor to calculate a second reference position; and
a set of instructions stored in the memory and executable by the processor to calculate velocity using the first reference position, the second reference position, and the elapsed time between the calculation of the first reference position and the second reference position.

5. The apparatus of claim 4, further comprising a set of instructions stored in the memory and executable by the processor to calculate ground track and ground speed using the first reference position, the second reference position, and the elapsed time between the calculation of the first reference position and the second reference position.

6. The apparatus of claim 4, wherein at least one of the at least three known radio transmitters is identified by a unique station identifier broadcast from a station.

7. A navigation apparatus comprising:
a radio receiver;
at least one directional antenna communicatively coupled to the radio receiver, the directional antenna providing relative bearing information to the radio receiver;
a navigation computer including a memory and a processor, the navigation computer being communicatively coupled to the radio receiver to receive relative bearing information;
a database stored in the memory, the database including a record of position information and a record of radio frequency information for a plurality of known radio transmitters;
a set of instructions stored in the memory and executable by the processor to cause the radio receiver to tune to at least three known radio transmitters selected from the plurality of known radio transmitters using the record of radio frequency information;
a set of instructions stored in the memory and executable by the processor to use relative bearing information from the at least one directional antenna to the at least three known radio transmitters and to use the record of position information to calculate a first reference position;
a set of instructions stored in the memory and executable by the processor to calculate a true bearing from the first reference position to a known position using the first reference position and a known position of at least one of the at least three known radio transmitters;
a set of instructions stored in the memory and executable by the processor to use relative bearing information to the at least three known radio transmitters and to use the true bearing to calculate a true heading;
a set of instructions stored in the memory and executable by the processor to calculate a second reference position;
a set of instructions stored in the memory and executable by the processor to calculate velocity using the first reference position, the second reference position, and the elapsed time between the calculation of the first reference position and the second reference position; and
a display communicatively coupled to the navigation computer to display the first reference position, the second reference position, the true heading, and velocity.

8. For use in a navigation system of the type that includes a radio receiver and a directional antenna, a navigation computer comprising:
a communications port for communicatively coupling the navigation computer to the radio receiver;
a memory;
a processor;
a database stored in the memory, the database including a record of position information and a record of radio frequency information for a plurality of known radio transmitters;

a set of instructions stored in the memory and executable by the processor to cause the radio receiver to tune to at least three known radio transmitters selected from the plurality of known radio transmitters using the record of radio frequency information;

a set of instructions stored in the memory and executable by the processor to use relative bearing information from the at least one directional antenna to the at least three known radio transmitters and to use the record of position information to calculate a first reference position;

a set of instructions stored in the memory and executable by the processor to calculate a true bearing from the first reference position to a known position using the first reference position and a known position of at least one of the at least three known radio transmitters; and a set of instructions stored in the memory and executable by the processor to use relative bearing information to the at least three known radio transmitters and to use the true bearing to calculate a true heading.

9. For use in a navigation system of the type that includes a radio receiver and a directional antenna, a navigation computer comprising:

a communications port for communicatively coupling the navigation computer to the radio receiver;

a memory;

a processor;

a database stored in the memory, the database including a record of position information and a record of radio frequency information for a plurality of known radio transmitters;

a set of instructions stored in the memory and executable by the processor to cause the radio receiver to tune to at least three known radio transmitters selected from the plurality of known radio transmitters using the record of radio frequency information;

a set of instructions stored in the memory and executable by the processor to use relative bearing information from the at least one directional antenna to the at least three known radio transmitters and to use the record of position information to calculate a first reference position;

a set of instructions stored in the memory and executable by the processor to calculate a second reference position; and a set of instructions stored in the memory and executable by the processor to calculate velocity using the first reference position, the second reference position, and the elapsed time between the calculation of the first reference position and the second reference position.

10. The navigation computer of claim 9, wherein the position information includes latitude and longitude for the plurality of known radio transmitters.

11. A method for determining position, comprising the steps of:

maintaining a database in a memory, the database including a record of position information and a record of frequency information for a plurality of known, stationary radio transmitters;

tuning to a first set of at least three of the plurality of known, stationary radio transmitters using the record of frequency information;

determining a first set of relative bearings from at least one directional antenna to each of the transmitters in the first set of at least three known radio transmitters;

calculating, in a processor communicatively coupled to the memory, a first reference position using the first set of relative bearings and using the record of position information;

calculating, in the processor, a true bearing from the first reference position to a known position of a reference transmitter selected from the first set of at least three known radio transmitters using the first reference position and the record of position information; and calculating, in the processor, a true heading using the true bearing and using a relative bearing from the at least one directional antenna to the reference transmitter.

12. The method of claim 11, further comprising:

transmitting the first reference position to a display device.

13. The method of claim 11, further comprising:

transmitting the first reference position to a flight management device.

14. The method of claim 11, further comprising:

transmitting the first reference position to a display device and to a flight control device; and transmitting the true heading to the display device and to the flight control device.

15. A method for determining position, comprising the steps of:

maintaining a database in a memory, the database including a record of position information and a record of frequency information for a plurality of known, stationary radio transmitters;

tuning to a first set of at least three of the plurality of known, stationary radio transmitters using the record of frequency information;

determining a first set of relative bearings from at least one directional antenna to each of the transmitters in the first set of at least three known radio transmitters;

calculating, in a processor communicatively coupled to the memory, a first reference position using the first set of relative bearings and using the record of position information;

tuning to a second set of at least three of the plurality of known, stationary radio transmitters using the record of frequency information;

determining a second set of relative bearings from the at least one directional antenna to each of the transmitters in the second set of at least three known radio transmitters;

calculating, in the processor, a second reference position using the second set of relative bearings and using the record of position information; and calculating, in the processor, ground speed using the first reference position, the second reference position, and a time measurement between calculating the first position and the second position.

16. The method of claim 15, further comprising:

calculating, in the processor, a ground track using the first reference position and the second reference position; and transmitting the first reference position, the second reference position, the true heading, the ground speed, and the ground track to a display device and to a flight management device.

* * * * *